US005476246A

United States Patent [19]

Wendel et al.

[11] Patent Number: 5,476,246

[45] Date of Patent: Dec. 19, 1995

[54] ROTATING ACTUATOR

[75] Inventors: Friedrich Wendel, Weissach; Johannes Meiwes, Markgroeningen; Micheal Giesbert, Tamm; Franz Willenecker, Munich; Huu-Duc Dang, Eching, all of Germany

[73] Assignee: Robert Bosch GmbH, Stuttgart, Germany

[21] Appl. No.: 211,126

[22] PCT Filed: Aug. 5, 1993

[86] PCT No.: PCT/DE93/00687

§ 371 Date: Apr. 20, 1994

§ 102(e) Date: Apr. 20, 1994

[87] PCT Pub. No.: WO94/04811

PCT Pub. Date: Mar. 3, 1994

[30] Foreign Application Priority Data

Aug. 22, 1992 [DE] Germany .......................... 42 27 951.8

[51] Int. Cl.[6] ...................................................... F16K 5/10

[52] U.S. Cl. ..................... 251/129.11; 251/123; 251/209; 251/309

[58] Field of Search .................................... 251/118, 123, 251/129.11, 209, 309

[56] References Cited

U.S. PATENT DOCUMENTS

| | | | |
|---|---|---|---|
| 2,449,833 | 9/1948 | Barnes | 251/209 |
| 5,239,961 | 8/1993 | Neidhard | 251/129.11 X |
| 5,275,373 | 1/1994 | Kalippke | 251/209 X |

FOREIGN PATENT DOCUMENTS

| | | |
|---|---|---|
| 91/14090 | 9/1991 | WIPO . |

*Primary Examiner*—Robert G. Nilson
*Attorney, Agent, or Firm*—Edwin E. Greigg; Ronald E. Greigg

[57] ABSTRACT

A rotating actuator comprising, eddying causes noise production that is to be avoided flat boundary faces formed at a throttle opening, and a flat boundary face that is formed at an outlet opening. Streamlined transitions with one convex and one concave region each are provided in the inlet connection piece from a frustoconical constriction to the boundary faces, and a streamlined transition with one convex and one concave region to a frustoconical widening of the outlet connection piece is provided in the outlet connection piece. The rotating actuator is used in particular to regulate the idling rpm of internal combustion engines.

5 Claims, 3 Drawing Sheets

ROTATING ACTUATOR

PRIOR ART

The invention is based on a rotating actuator as defined hereinafter. A rotating actuator is already known (German Patent Disclosure DE 40 07 260 A1) International Patent WO91/14090, but in which undesirable noise can occur because of eddying, especially when intake tubes and intake tube connections of plastic are used.

ADVANTAGES OF THE INVENTION

The rotating adjuster according to the invention has the disadvantage over the prior art that irritating noise occurring when there is a flow through the rotary slide housing is counteracted by reducing the eddying.

Advantageous further developments to and improvements of the rotating actuator are advantageous to embody a boundary face, located parallel to the flow direction, and a streamlined transition with a concave and an ensuing convex region in the outlet connection piece of the rotary slide housing; as a result, the noise occurring when there is a flow through the rotary slide housing can be reduced still further.

DRAWING

An exemplary embodiment of the invention is shown in simplified fashion in the drawing and described in detail in the ensuing description. FIG. 1 shows a longitudinal section through a rotating actuator embodied according to the invention; FIG. 2 is a plan view of the inlet connection piece of the rotating actuator, and FIG. 3 is a section along the line III—III in FIG. 2.

DESCRIPTION OF THE EXEMPLARY EMBODIMENT

Figure 1:
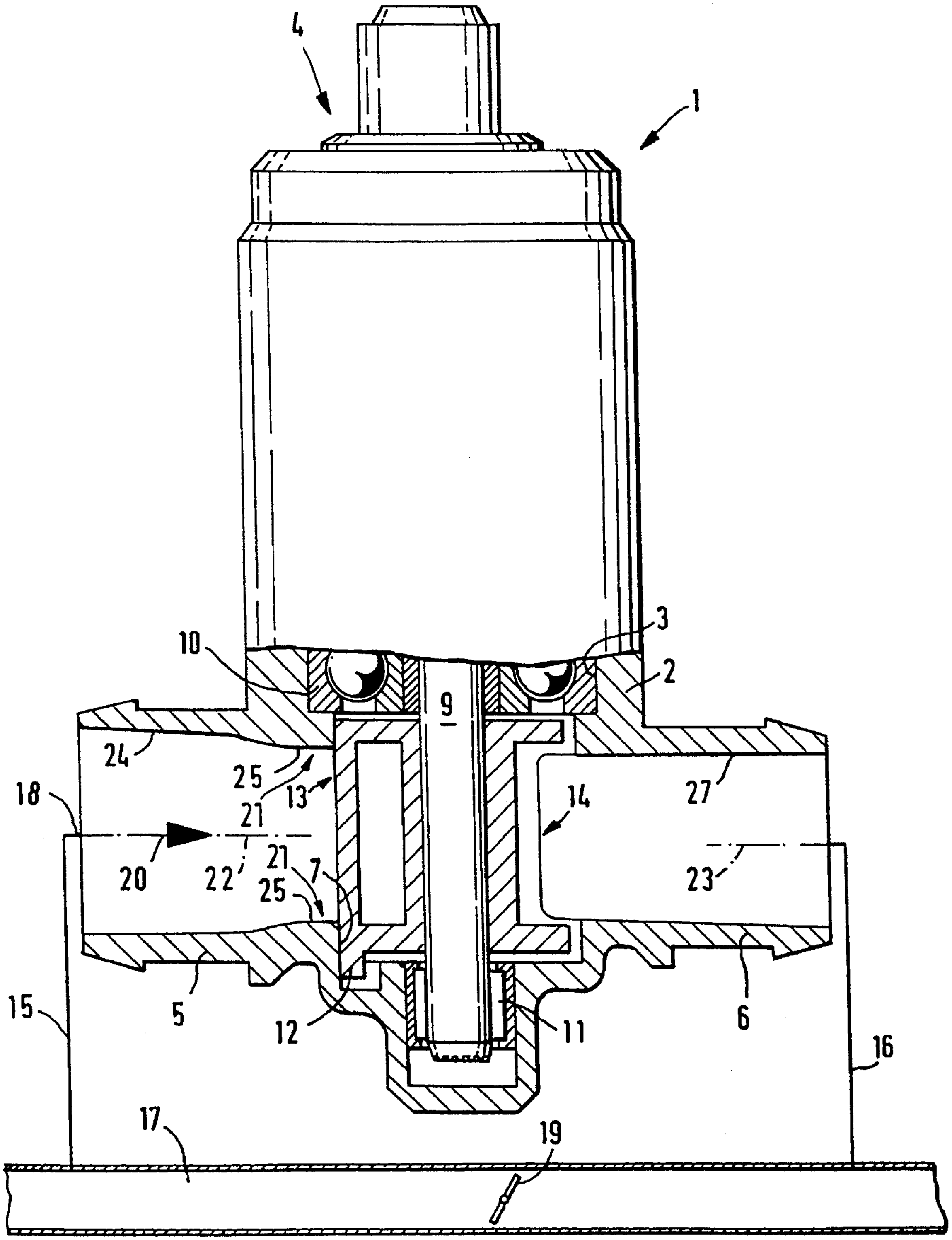

FIG. 1 shows a rotating actuator 1 for regulating the idling rpm of an internal combustion engine; it has a rotary slide housing 2 with a cup-shaped receiving opening 3, into which a control motor 4 that can be acted upon by an rpm-dependent control signal is inserted. An inlet connection piece 5 and an outlet connection piece 6 are formed laterally on the rotary slide housing 2 and extend into a bore 7, extending in the rotary slide housing 2 coaxially with the receiving opening 3.

The control motor 4 of the rotating actuator 1 is connected, via a shaft 9 that for instance is supported in two spaced roller bearings 10, 11, to a rotary slide 12 that is rotatably disposed concentrically in the bore 7 and assumes a rotational angle position corresponding to the control signal of the control motor 4. In the region where the inlet connection piece 5 discharges into the bore 7, the rotary slide housing 2 has a throttle opening 13, which is closed more or less by the rotary slide 12 in accordance with a rotational angle position of the control motor 4. Opposite the throttle opening 13 in the bore 7 is an outlet opening 14, which discharges into the outlet connection piece 6. The inlet and outlet connection pieces 5 and 6 communicate via connection lines 15, 16 with an intake tube 17 in such a way that they form a bypass line 18, which bypasses a throttle valve 19 disposed in the intake tube 17; with the throttle opening 13 open, the operating medium can flow in the bypass line 18 in the direction of the arrow 20 to the engine. The connection lines 15, 16 and the intake tube 17 may be made from metal and/or plastic.

Figure 3:
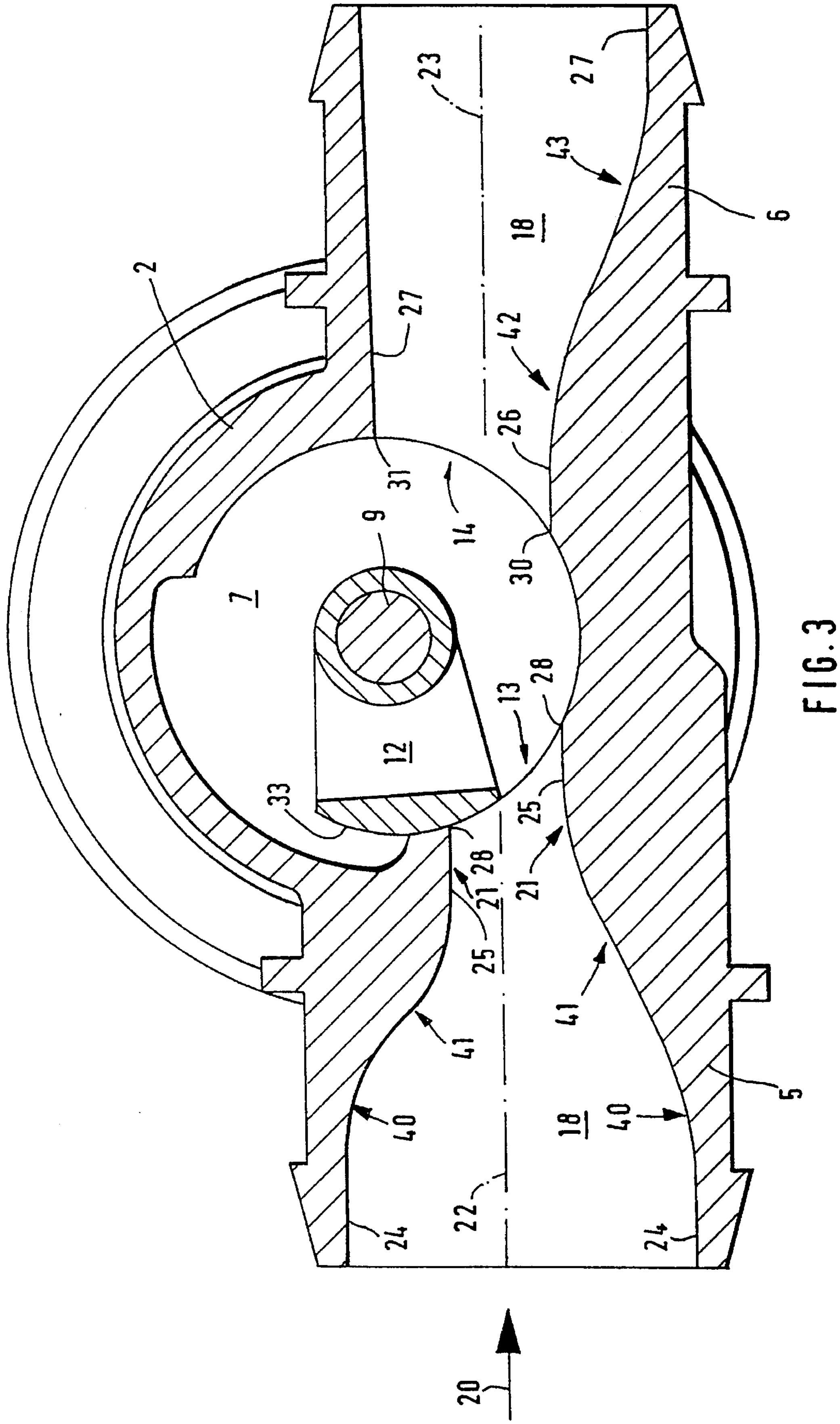

The inlet connection piece 5 has a longitudinal axis 22, and the outlet connection piece 6 has a longitudinal axis 23, which are located on the same line and extend at right angles to the shaft 9. The longitudinal axis 22, 23 are laterally offset in such a way that they extend past the shaft 9 and do not intersect it (FIG. 3). For the sake of simplicity in the drawing, the inlet connection piece 5 and the outlet connection piece 6 are shown shifted into the plane of the drawing in FIG. 1.

The flow cross section of the bypass line 18, downstream of the discharge point of the connection line 15 into the inlet connection piece 5, has a slight frustoconical constriction 24. In a portion 21 of the inlet connection piece 5 located upstream of the throttle opening 13, the flow cross section is defined by flat boundary faces 25, extending parallel to the longitudinal axis 22, that enclose a quadrilateral. Between the frustoconical constriction 24 and the boundary faces 25, a steady, streamlined transition is provided in according with the invention. Downstream of the outlet opening 14 up to the discharge point of the outlet connection piece 6 into the connection line 16, the bypass line 8 has a slight frustoconical enlargement 27.

Figure 2:
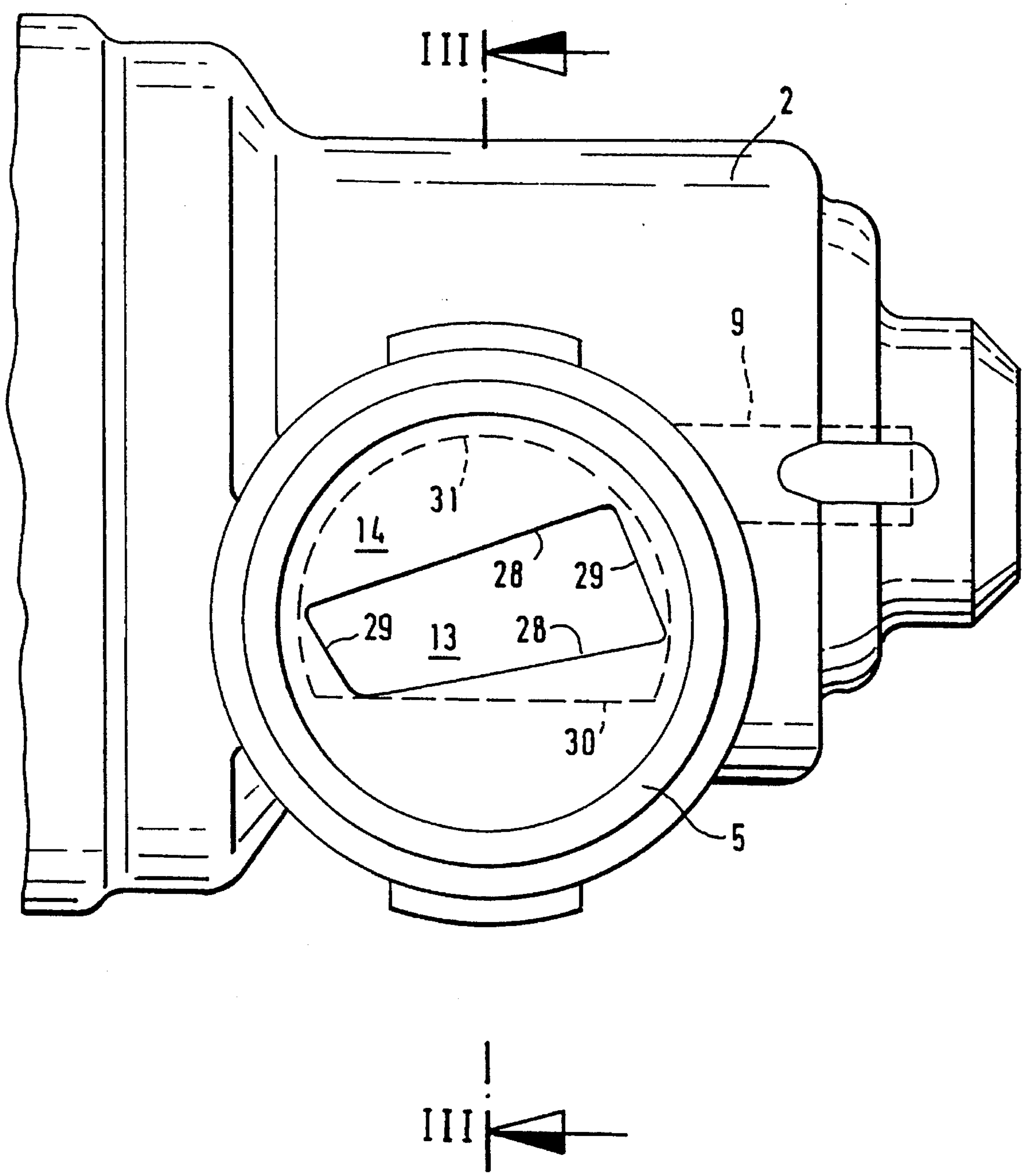

FIG. 2 shows that the throttle opening 13 located in the inlet connection piece 5 is formed by two opposed longer boundary edges 28 and two opposed shorter boundary edges 29, which in a known manner are formed in approximately rectangular or parallelogram fashion with respect to one another and are oblique to the axis of the shaft 9, represented by a dotted line. The boundary faces 25 (FIG. 1) are arranged such that they extend through the corresponding boundary edges 28, 29 and are approximately parallel to one another. The outlet opening 14, shown in dashed lines in FIG. 2 and located opposite the throttle opening 13 in the rotary slide housing 2, has a larger cross section than the throttle opening 13 and on its side remote from the shaft 9 has a straight boundary edge 30, which extends approximately parallel to the longitudinal axis of the shaft 9. Outside the straight boundary edge 30, the outlet opening 14 has a boundary edge 31 with a curved course, which by way of example may be circular in projection.

FIG. 3 shows the bore 7, disposed in the rotary slide housing 2, in which bore the shaft 9 is concentrically disposed, with which shaft the rotary slide 12 is connected in a manner fixed against relative rotation. The rotary slide 12 has an outer face 33 that corresponds to the diameter of the bore 7 and that more or less closes the throttle opening 13 depending on the rotational angle position of the shaft 9, so that the quantity of operating medium flowing in the direction of the arrow 20 is controllable by rotating the shaft 9. The flow cross section at the throttle opening 13 can be opened completely by rotating the shaft 9 clockwise; the flow cross section at the throttle opening 13 can be closed completely by rotating the shaft 9 counterclockwise.

If the throttle opening 13 is at least partially open, the operating medium flows via the frustoconical constriction 24 to the throttle opening 13, with the transition to the reduced flow cross section of the throttle opening 13 being streamlined, without an abrupt change in cross section. Approximately in its first third, the inlet connection piece 5 has the frustoconical constriction 24, which is adjoined by a region 40 of concave course, which changes into a region 41 of convex course. Adjoining the region 41 is the region 21 having the flat boundary faces 25, which extend through the boundary faces 28, 29. The result is an approximately S-shaped course of the transition from the frustoconical constriction 24 to the boundary faces 25. Beyond approximately the last third of the length of the inlet connection piece 5, the flow cross section is defined by the opposed boundary faces 25, which each extend through the longer boundary edges 28. The boundary faces 25 associated with the shorter boundary edges 29 may be shorter, in the flow direction, than approximately one-third of the length of the inlet connection piece 5.

Downstream of the outlet opening 14, the outlet connection piece 6 beginning at the straight boundary edge 30 first extends along a flat boundary face 26 that touches the boundary edge 30 and is oriented approximately parallel to the longitudinal axis 23. After approximately one-third of its length, the outlet connection piece 6, in a region 42, has a convex course curved toward the longitudinal axis 23, so that the flow cross section in the region 42 widens increasingly in the flow direction. Adjoining the region 42, after approximately half the length of the outlet connection piece 6, a concave region 43 follows, curved counter to the longitudinal axis 23 of the outlet connection piece 6, so that in the region 43 the flow cross section widens decreasingly in the flow direction. The frustoconical widening 27 extending over approximately the last third of the outlet connection piece 6 borders on the region 43. Outside the straight boundary edge 30, the frustoconical widening 27 begins, directly at the circular boundary edge 31. All of the lengths given are in terms of the respective sectional plane shown in the drawing. Outside this sectional plane, the lengths of the transitions shorten in accordance with their distance from one of the longitudinal axis 22, 23.

Because of the design according to the invention of the flow course in the rotating actuator, less turbulence in the operating medium results, and as a result the noise development, particularly with intake tubes and intake tube connections of plastic, is decreased.

We claim:

1. A rotatable actuator for controlling a throttle cross section in a flow line that carries an operating medium for an internal combustion engine, having a housing and a control motor that via a shaft drives a rotary slide which functions as a throttle device, said shaft is rotatably disposed centrally in a bore of the housing, wherein the operating medium to be controlled flows through an inlet connection piece having a quadrilateral throttle opening with two opposing longer (28) and shorter (29) boundary edges each facing one another, respectively, via an outlet opening into an outlet connection piece, and the inlet and outlet connection pieces have longitudinal axes that are located in a same line, beginning at a throttling opening (13), at least two boundary faces (25) are formed upstream in the inlet connection piece, which extend through opposed boundary edges (28, 29) and are disposed parallel to a longitudinal axis (22) of the inlet connection piece (5), and the transitions of the cross section from the boundary faces (25) juxtaposed said rotary slide to upstream of the inlet connection piece (5) are effected by means of one each convex region (41) and concave region (40), said convex region (41) adjoins the boundary faces (25) and the concave region (40) adjoins the convex region along an inner surface of said inlet.

2. A rotatable actuator for controlling a throttle cross section in a flow line that carries an operating medium for an internal combustion engine, having a housing and a control motor that via a shaft drives a rotary slide which functions as a throttle device, said shaft is rotatably disposed centrally in a bore of the housing, wherein the operating medium to be controlled flows through an inlet connection piece having a quadrilateral throttle opening with two opposing longer (28) and shorter (29) boundary edges each facing one another, respectively, via an outlet opening into an outlet connection piece, and the inlet and outlet connection pieces have longitudinal axes that are located in a same line, beginning at the throttling opening (13) , at least two boundary faces (25) are formed upstream in the inlet connection piece, which extend through opposed boundary edges (28, 29) and are disposed parallel to a longitudinal axis (22) of the inlet connection piece (5), and the transitions of the cross section from the boundary faces (25) juxtaposed said rotary slide to upstream of the inlet connection piece (5) are effected by means of one each convex region (41) and concave region (40) adjoining the convex region along an inner surface of said inlet, and immediately upstream of the concave region (40) in the inlet connection piece (5), a frustoconical constriction (24) extends in the flow direction.

3. A rotatable actuator for controlling a throttle cross section in a flow line that carries an operating medium for an internal combustion engine, having a housing and a control motor that via a shaft drives a rotary slide which functions as a throttle device, said shaft is rotatably disposed centrally in a bore of the housing, wherein the operating medium to be controlled flows through an inlet connection piece having a quadrilateral throttle opening with two opposing longer (28) and shorter (29) boundary edges each facing one another, respectively, via an outlet opening into an outlet connection piece, and the inlet and outlet connection pieces have longitudinal axes that are located in a same line, beginning at the throttling opening (13), at least two boundary faces (25) are formed upstream in the inlet connection piece, which extend through opposed boundary edges (28, 29) and are disposed parallel to a longitudinal axis (22) of the inlet connection piece (5), and the transitions of the cross section from the boundary faces (25) juxtaposed said rotary slide to upstream of the inlet connection piece (5) are effected by means of one each convex region (41) and concave region (40), said convex region (41) adjoins the boundary faces (25) and the concave region (40) adjoins the convex region along an inner surface of said inlet, and the outlet opening (14) has one straight boundary edge (30), through which a boundary face (26) extends parallel to the longitudinal axis (23) of the outlet connection piece (6), and the transition to the flow cross section of the outlet connection piece (6) is effected by means of one convex region (42) and one concave region (43) adjoining the convex region.

4. A rotating actuator as defined by claim 3, in which immediately downstream of the concave region (43) in the outlet connection piece (6), a frustoconical widening (27) extending in the flow direction is provided.

5. A rotating actuator as defined by claim 4, in which the outlet opening (14), outside the straight boundary edge (30), is defined by a boundary edge (31) that is circular in projection, and the frustoconical widening (27) of the outlet connection piece (6) begins at this circular boundary edge (31).

* * * * *